(12) United States Patent
Imai et al.

(10) Patent No.: US 7,086,220 B2
(45) Date of Patent: Aug. 8, 2006

(54) REGENERATION CONTROL METHOD FOR CONTINUOUSLY REGENERATING DIESEL PARTICULATE FILTER DEVICE

(75) Inventors: Takehito Imai, Fujisawa (JP); Tsuneo Suzuki, Fujisawa (JP); Masashi Gabe, Fujisawa (JP); Naofumi Ochi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/216,093

(22) Filed: Sep. 1, 2005

(65) Prior Publication Data

US 2005/0284138 A1   Dec. 29, 2005

Related U.S. Application Data

(62) Division of application No. 10/416,714, filed as application No. PCT/JP02/06375 on Jun. 26, 2002, now Pat. No. 6,952,918.

(30) Foreign Application Priority Data

Jun. 26, 2001   (JP)   .............................. 2001-192387

(51) Int. Cl.
*F01N 3/00*   (2006.01)

(52) U.S. Cl. ............................ 60/274; 60/286; 60/295; 60/297; 60/311

(58) Field of Classification Search .................. 60/274, 60/285, 286, 295, 297, 311; 55/DIG. 30
See application file for complete search history.

(56) References Cited

U.S. PATENT DOCUMENTS

| 4,515,758 A | 5/1985 | Domesle et al. |
|---|---|---|
| 4,630,438 A | 12/1986 | Shinzawa |
| 5,595,580 A | 1/1997 | Kawamura |
| 6,237,326 B1 | 5/2001 | Russell |
| 6,304,815 B1 | 10/2001 | Moraal et al. |
| 6,594,990 B1 * | 7/2003 | Kuenstler et al. ............. 60/295 |
| 6,622,480 B1 | 9/2003 | Tashiro et al. |
| 6,651,638 B1 | 11/2003 | Oakes |
| 6,763,659 B1 * | 7/2004 | Watanabe et al. ............. 60/297 |
| 6,820,418 B1 * | 11/2004 | Nakatani et al. ............. 60/297 |
| 6,865,884 B1 * | 3/2005 | Braun et al. ................... 60/295 |
| 6,865,885 B1 * | 3/2005 | Kitahara ....................... 60/297 |
| 6,948,311 B1 * | 9/2005 | Schaller et al. ............... 60/286 |
| 6,952,918 B1 * | 10/2005 | Imai et al. .................... 60/295 |
| 2003/0182936 A1 | 10/2003 | Kitahara |

(Continued)

FOREIGN PATENT DOCUMENTS

JP   1-105719   7/1989

(Continued)

OTHER PUBLICATIONS

International Search Report dated Oct. 29, 2002 for Application No. PCT/JP02/06375.

*Primary Examiner*—Tu M. Nguyen
n
(74) *Attorney, Agent, or Firm*—Staas & Halsey LLP

(57) ABSTRACT

A regeneration control method for regenerating a continuously regenerating diesel particulate filter device capable of regenerating a filter by efficiently removing PM while suppressing the deterioration of fuel consumption and preventing a drivability from being deteriorated, wherein the clogged-state of the filter is judged in three or more phases of the clogged-state and, when the clogged-state of the filter reaches a specified phase, a specified regenerating mode operation set in correspondence with the reached phase is performed.

1 Claim, 10 Drawing Sheets

U.S. PATENT DOCUMENTS

2003/0230078 A1   12/2003   Yahata et al.

FOREIGN PATENT DOCUMENTS

| JP | 8-177463 | 7/1996 |
|---|---|---|
| JP | 9-68033 | 3/1997 |
| JP | 9-222009 | 8/1997 |
| JP | 10-259711 | 9/1998 |
| JP | 11-101122 | 4/1999 |

* cited by examiner

Fig.7
(a) (2nd phase of clogging : low Quantity of the collected PM)
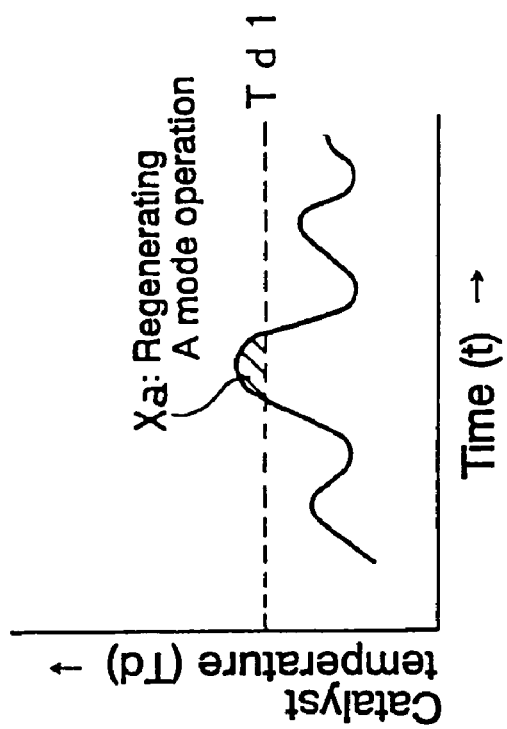
(b)
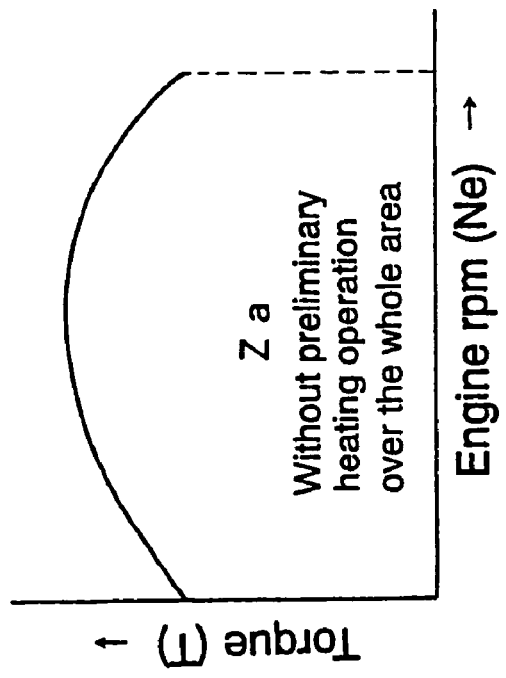

Fig. 9
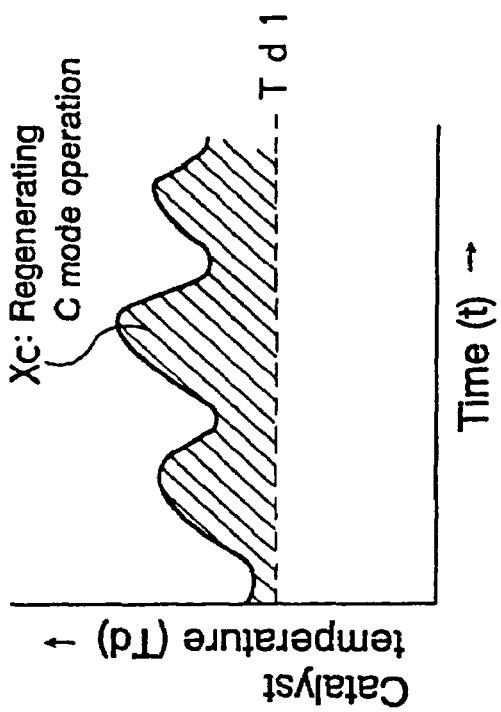
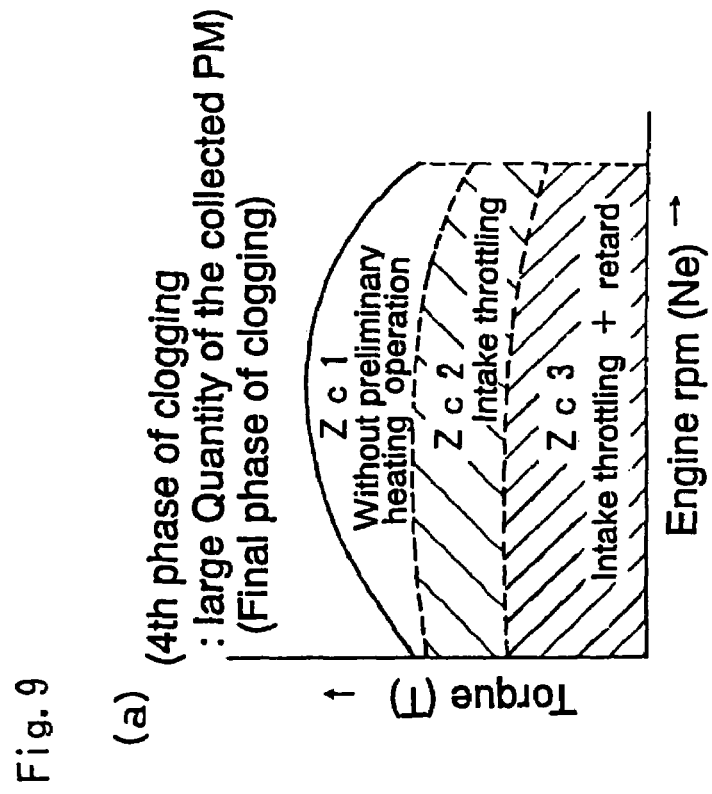

REGENERATION CONTROL METHOD FOR CONTINUOUSLY REGENERATING DIESEL PARTICULATE FILTER DEVICE

CROSS-REFERENCE TO RELATED APPLICATIONS

This application is a divisional application of U.S. patent application Ser. No. 10/416,714 filed on May 14, 2003, now U.S. Pat. No. 6,952,918, the contents of which are incorporated by reference, which is based on PCT Application PCT/JP02/06375 filed Jun. 26, 2002, which claims priority to Japanese Application JP2001-192387 filed Jun. 26, 2001.

BACKGROUND OF THE INVENTION

1. Field of the Invention

The present invention concerns a regeneration control method for continuously regenerating a diesel particulate filter device provided with a filter, which purifies the exhaust gas by collecting particulate matter of the diesel engine.

2. Description of the Related Art

The exhaust gas quantity of particulate matter (PM: particulate matter: referred to as PM hereinafter) exhausted from the diesel engine is regulated strictly year by year with NOx, CO, HC and so on. Technologies for reducing the quantity of PM discharged outside, by collecting this PM with a filter called "diesel particulate filter" (DPF: Diesel Particulate Filter: referred to as DPF hereinafter) are developed.

The DPF for collecting PM includes a monolith honeycomb wall flow type filter made of ceramic, a fiber type filter made of ceramic or metal fiber, and so on. The exhaust gas purifier using these DPFs is installed in the middle of the engine exhaust pipe, similarly to the other exhaust gas purifiers, for purifying exhaust gas generated by the engine.

However, in this DPF for collecting PM, clogging progresses along with the collection of PM and the exhaust gas pressure (discharge pressure) along with the increase of the quantity of collected PM, requiring to remove PM from this DPF; hence, several methods and apparatuses are being developed.

For these apparatuses, those of a system for installing two (2) circuits of exhaust passage, each provided with a DPF, and for collecting PM and burning the collected PM to regenerate the filter alternately, also those of the continuously regenerating system for forming an exhaust passage with a single circuit, and for performing the treatment operation for filter regeneration to oxidize and remove the collected PM, all the way collecting PM by a DPF installed in this exhaust passage, are proposed.

The apparatus of this continuously regenerating system, described above, includes a continuously regenerating type DPF device provided with an oxidation catalyst upstream the DPF, called CRT (Continuously regenerating trap), a continuously regenerating type DPF device for reducing the combustion temperature of PM by the effect of a catalyst carried by the filter, called CSF (Catalyzed Soot Filter) to oxidize and remove PM by the exhaust gas, and so on.

As shown in FIG. 10, the continuously regenerating type DPF device 20A called CRT, utilizes the fact that PM is oxidized by nitrogen dioxide at lower temperature rather than the case where PM is oxidized by oxygen ($O_2$) in the exhaust gas G, and is composed of an oxidation catalyst 21A and a filter 22A. Nitrogen monoxide (NO) in the exhaust gas G is oxidized into nitrogen dioxide ($NO_2$) by the upstream side oxidation catalyst 21A carrying platinum or the like, and PM collected by the downstream side filter 22A is oxidized, by this nitrogen dioxide ($NO_2$), into carbon monoxide ($CO_2$), for removing PM.

Also, as shown in FIG. 11, the continuously regenerating type DPF device 20B called CSF is composed of a filter 22B with catalysis which has a catalyst such as cerium oxide ($CeO_2$). Moreover, in the area of the lower temperature (300° C. to 600° C.), mainly, PM is oxidized through a reaction ($4CeO_2+C \rightarrow 2Ce_2O_3+CO_2$, $2Ce_2O_3+O_2 \rightarrow 4CeO_2$ and so on). Besides, in the area of the higher temperature (not less than 600° C.), PM is oxidized by oxygen ($O_2$) in the exhaust gas G.

However, for these continuously regenerating type DPF devices as well, in case of lower exhaust temperature or during an operation state with a low quantity of nitrogen monoxide (NO) emission, the aforementioned reaction for PM oxidation and removal does not occur due to the lowered catalyst activity followed by the lowered catalyst temperature, or lack of nitrogen monoxide (NO). Accordingly the filter cannot be regenerated and PM continues to build up in the filter, resulting in filter clogging.

Consequently, in these continuously regenerating type DPF devices, a regeneration control is performed for estimating the quantity of the collected PM in case of regenerating the filter, and for oxidizing and removing PM caught in the filter through a forced elevation of exhaust temperature or increase of the quantity of nitrogen monoxide (NO) emission, by changing the engine operation state to the regenerating mode operation, in case where this estimated quantity of the collected PM exceeds a predetermined value.

Then, in the conventional continuously regenerating type DPF device, a regeneration control judges when to start the regenerating mode operation, in case where the estimated quantity of the collected PM exceeds a predetermined judgment value by clogging the filter, the device performs the regeneration control to switch to the regenerating mode operation regardless of engine operation state at the time of the judgment.

In this regenerating mode operation, because it is necessary to heat an oxidation catalyst or filter with catalysis to a temperature not less than the predetermined temperature for activation of the catalyst of the oxidation catalyst or filter with catalysis, it is so composed to maintain the catalyst temperature not less than the activation temperature by heating it up with the exhaust gas.

For instance, if a regenerating mode operation including a post-injection is performed, as this post-injected fuel gets burned in a down stroke of the piston, the contribution to the engine output is low, while the contribution to heating up the exhaust is high, which is effective for heating up the exhaust.

However, in this post-injection, the whole of the injected fuel cannot complete the combustion entirely in a cylinder, but a part thereof is emitted into the exhaust passage as unburned HC or CO. At this moment, if the catalyst temperature becomes not less than the activation temperature, these unburned HC or CO is oxidized by the catalyst and contributes to heating up the exhaust. However in case where it has not become not less than the activation temperature, the unburned HC or CO will be emitted as they are without contributing to heating up the exhaust, thereby causing pollution. Moreover, the filter regeneration becomes insufficient.

On the other hand, since the engine operation states has various states, at the time when it is judged to start the regenerating mode operation, it is necessary to raise the exhaust gas temperature to not less than a fixed temperature, during the regenerating mode operation. So, when the exhaust temperature is low as in the case of low speed operation, low load operation, and so on, an operation to heat up the exhaust gas is performed to coercively raise the exhaust gas temperature.

For instance, in the idling operation, low speed operation or engine brake functioning operation on the downhill etc, the fuel is burned scarcely, and exhaust gas at lower temperature flows into the continuously regenerating type DPF device, thus the catalyst temperature and the catalyst activity will be lowered.

Especially, in case of using a vehicle having a continuously regeneration type DPF device on board is used for door-to-door delivery service or the like dominated by the urban area traveling, the engine is often operated with a low exhaust gas temperature, thus in the regenerating mode operation, it is often necessary to perform the control for heating up the exhaust to raise the exhaust gas temperature.

Then, in the conventional control method for heating up the exhaust gas, as only a single kind of control for heating up the exhaust gas composed by combining several of, preset, injection timing retard (delay) of fuel injection, post-injection, admission throttling, exhaust throttling, EGR, load increase by driving an auxiliary, heating up the exhaust gas by a heating means such as electric heater, burner or the like, and so on, is performed. Therefore the operation for heating up the exhaust gas turns up to be executed by this single kind of control for heating up the exhaust gas, independently on the catalyst temperature of that time, if the exhaust gas temperature, catalyst temperature or others are not more than a predetermined temperature.

However, since the control for heating up the exhaust gas provided only in this single kind, is composed to securely heat up an exhaust gas of the supposed lowest temperature, this control for heating up the exhaust gas performs the operation for raising temperature, which is far from the operation state of idling operation or low speed operation etc.

Consequently, this control for heating up the exhaust gas for coercively raising the exhaust gas temperature provokes the problem of deteriorated fuel consumption, because heat energy supplied from the fuel or the exterior is consumed unnecessarily for heating up the exhaust gas, or unnecessary equipment is driven. Further, there is a problem of deterioration of drivability, because engine output variation is provoked by this control for heating up the exhaust, when it is changed over to the regenerating mode operation during the driving.

SUMMARY OF THE INVENTION

The present invention is devised in order to solve the aforementioned problems. The objective of the present invention is to provide a regeneration control method for the continuously regenerating diesel particulate filter device allowing to regenerate the filter by removing PM efficiently. It limits the deterioration in fuel consumption and at the same time prevents the drivability from deteriorating, by selecting an appropriate control for heating up the exhaust among control for heating up the exhaust gas prepared in a plurality of ways, and by shifting to a regenerating mode operation involving this control for heating up the exhaust gas, in an appropriate period for the regeneration treatment, even if the phase of clogging is on the middle order, through the observation of the state where PM is collected and exhaust temperature or catalyst temperature simultaneously, in a continuously regenerating diesel particulate filter device.

In order to achieve the aforementioned object, the regeneration control method for continuously regenerating diesel particulate filter (DPF) device is composed as follow.

1) A regeneration control method for the regeneration of the filter in a continuously regenerating diesel particulate filter device comprising a filter, for collecting particulate matter in the engine exhaust gas by the filter and at the same time oxidizing and removing collected particulate matter, wherein the clogged-state of the filter is judged by classifying in three or more phases of clogged-state and, a specific regenerating mode operation set in correspondence with the reached phase is performed when the clogged-state of the filter reaches a specified phase.

In other words, even in a specified phase of clogging where particulate matter builds up somewhat in the filter, a preset regenerating mode operation is performed for filter regeneration treatment, when the oxidation catalyst is warm or otherwise the filter can be regenerated efficiently.

The judgment of this clogged-filter-phase can be performed by the difference of discharge pressure of the front and the back of the filter, comparison of pressure ratio and a specified judgment value, and so on. Also, it can be performed by calculating the difference between the quantity of particulate matter (PM) emitted from the engine operation state and the quantity of particulate matter oxidized and removed, estimating the quantity of particulate matter to build up in the filter from this difference, and comparing this accumulated quantity and the specified judgment value.

Also, this specified regenerating mode operation is an operation for executing a control for heating up the exhaust gas to coercively raise the exhaust gas temperature, in order to oxidize and remove the particulate matter collected by the filter. There, this control for heating up the exhaust gas can be composed by combining at least one, or, several of the following methods retard of main injection timing after fuel injection, after injection (post-injection), intake throttling, exhaust throttling, EGR, load increase by driving an auxiliary, and heating up the exhaust gas by a heating means.

According to this composition, the judgment of the clogged-filter-state concerning the filter regeneration control is not performed by a single judgment value, but by a plurality of judgment values, and when the clogged-state of the filter reaches a specified phase in three or more phases of phase of clogging, a specific regenerating mode operation set in correspondence with the reached phase is performed and consequently, the filter can be regenerated by the most appropriate specified regenerating mode operation set in correspondence with this reached phase of clogging.

Furthermore, even when the final phase of clogging is not reached, in a phase of clogging with margin before a complete clogging of the filter, or at least one of specified phases of clogging, the regeneration treatment is performed if the regeneration treatment can be performed efficiently, improving thereby the efficiency of the regeneration treatment and, also, the fuel consumption.

In this phase before reaching the final clogged-state, as the regeneration treatment may be performed only when the regeneration treatment can be performed efficiently, a regenerating mode operation that can limit the retard of fuel injection of the increase of load to the minimum, and lower the deterioration in fuel consumption and drivability.

Hence, as the burden concerning the filter regeneration can be mitigated by reducing the load of regeneration in the engine operation and, at the same time, the frequency of coercive regeneration provoking a large rise of temperature can be reduced, whereby, the deterioration in fuel consumption or the deterioration in drivability resulting from the regeneration operation can be avoided.

2) Then, the aforementioned regeneration control method for continuously regenerating diesel particulate filter device, in at least one specified phase of clogging among the specified phases of clogging composed to perform a regenerating mode operation set in correspondence with the specified phase of clogging, only when the index temperature for regeneration control is not less than a specified judgment value.

In other words, even in a specified phase of clogging where particulate matter builds up somewhat in the filter, a preset regenerating mode operation is performed for filter regeneration treatment, when the index temperature for regeneration control of the oxidation catalyst and so on is not less than a specified judgment value, the oxidation catalyst and so on are warm, and the filter can be regenerated efficiently.

This index temperature for regeneration control is a temperature to be used for regeneration control, or a temperature to be used for judging if a catalyst is the active area or not. As this temperature, any one of or combination of temperatures such as catalyst temperature, filter temperature, catalyst outlet exhaust temperature, filter inlet exhaust temperature and so on can be used. Besides, as this index temperature for regeneration control, the detection value of a temperature sensor arranged in respective part may be used; however, various temperatures estimated or calculated from values indicating the engine operation state such as engine rpm, load, and so on and previously input map data and so on may also be used.

There, as regenerating mode operation used in this case, a regenerating mode operation that can avoid the deterioration in fuel consumption or drivability, such as regenerating mode operation limiting the retard of fuel injection or the increase of load to the minimum, or the like can be set.

According to this composition, the regeneration treatment can be performed efficiently, because a judgment by the index temperature for regeneration control such as catalyst temperature is added, in a specified phase of clogging, the regenerating mode operation is performed only when the index temperature for regeneration control for performing the regeneration treatment efficiently is not less than a specified judgment temperature, and the regenerating mode operation is not performed when inferior to a specified temperature of low efficiency.

In short, PM can be eliminated efficiently and the filter can be regenerated all the way suppressing the deterioration of fuel consumption and preventing the drivability from being deteriorated, because the filter is regenerated by shifting to a regenerating mode operation without a substantial control for heating up the exhaust gas, when the clogging is moderate and, at the same time, the filter can be regenerated easily by burning PM.

It should be noted that, in case where a state of low index temperature for regeneration control continues and the regeneration in this specified phase of clogging is not performed, particulate matter (PM) continues to build up, exceeds the following judgment value (threshold) and attains the following phase of clogging, the filter shall be regenerated in a most appropriate regenerating mode operation, set in this phase.

3) Or, the aforementioned regeneration control method for continuously regenerating diesel particulate filter device, in at least one specified phase of clogging among the specified phases of clogging is composed to perform a regenerating mode operation set in correspondence with the specified phase of clogging, only when the engine operation state is in a specified engine operation area.

In this composition, the engine operation area is used for judgment, in place of index temperature for regeneration control, and this engine operation area can be set by combination of load and engine rpm, and so on, and integrated in the control by means of map data and so on. Besides, a correction brought by the outside air temperature and so on may further improve the exactitude.

It should be noted that, when a regenerating mode operation including a post-injection is performed, post-injected fuel cannot complete the combustion, and unburned HC is emitted in the exhaust passage. This unburned HC can be made to contribute to heating up the exhaust gas by oxidizing with the catalyst effect, in case where the catalyst is in its active temperature range, while, in case where the catalyst is not in its active temperature range, unburned HC is not oxidized and emitted as unburned, without contributing to heating up the exhaust gas. As the result, the efficiency is deteriorated, the deterioration in fuel consumption is provokes, and white smoke is generated to deteriorate the exhaust gas performance.

However, as the aforementioned regeneration control method for continuously regenerating diesel particulate filter device is composed to perform a regenerating mode operation including this post-injection only when the index temperature for regeneration control is not less than a specified judgment value, in a specified phase of clogging, or, only when the engine operation state is in a specified engine operation area, the exhaust temperature can be raised efficiently and the fuel consumption can be prevented from being deteriorated, all the way preventing white smoke from being emitted, through oxidation of unburned HC or CO by the catalyst effect, if these temperature or operation area are made to correspond to a case where the oxidation catalyst is in its active temperature range.

4) Also, the aforementioned regeneration control method for continuously regenerating diesel particulate filter device, in the regenerating mode operation to be performed in at least one specified phase of clogging among the specified phase of clogging is composed to select and perform one control among preset plurality of controls for heating up the exhaust, based on the detected index temperature for control for heating up.

This index temperature for control for heating up is a temperature used for controlling the heat and, any one of or combination of temperatures such as catalyst temperature, filter temperature, catalyst outlet exhaust temperature, filter inlet exhaust temperature and so on can be used. Besides, this index temperature for heating up may be the same temperature as the index temperature for regeneration control, and moreover, the detection value of a temperature sensor arranged in respective part may normally be used, similarly to the index temperature for regeneration control; however, various temperatures estimated or calculated from values indicating the engine operation state such as engine rpm, load, and so on and previously input map data and so on may also be used.

According to this composition, not only the judgment of clogged-filter-state but also the judgment by controlling for raising the index temperature are added, allowing to regenerate the filter by selecting a most appropriate control for heating up the exhaust gas, corresponding to the temperature range of the index temperature for heating up and this finer control for heating up the exhaust gas permits to save the fuel consumption and, at the same time, perform the regeneration treatment securely, while avoiding the deterioration in drivability.

5) Or, the aforementioned regeneration control method for continuously regenerating diesel particulate filter device, in at least one specified phase of clogging among the specified phases of clogging composed to select and perform one control among preset plurality of controls for heating up the exhaust gas, based on the detected engine operation state, in the regenerating mode operation to be performed.

In this composition, the engine operation area is used for judgment, in place of the index temperature for heating up, and this engine operation area can be set by combination of load and engine rpm, etc, and integrated in the control by means of map data and so on. Besides, a correction brought by the outside air temperature and so on may further improve the exactitude.

6) And, as for the continuously regenerating diesel particulate filter device, a continuously regenerating diesel particulate filter device having a catalyst carried by the filter, a continuously regenerating diesel particulate filter device provided with an oxidation catalyst on the upstream side of the filter, and a continuously regenerating diesel particulate filter device having a catalyst carried by the filter and at the same time provided with an oxidation catalyst on the upstream side of the filter can be the target.

Next, in order to facilitate the understanding of the present invention, an example of a case of three phases shall be shown, as a concrete one of multi-phasing of the aforementioned clogging-judgment and regenerating mode operation.

This regeneration control method for a continuously regenerating diesel particulate, filter device is a regeneration control method for the regeneration of the filter in a continuously regenerating diesel particulate filter device comprising a filter, for collecting particulate matter in the engine exhaust gas by the filter and at the same time oxidizing and removing the collected particulate matter, wherein:

the clogged-state of the filter is judged in three phases of clogged-state;

the regenerating mode operation is not performed, when the clogged-state of the filter is in the first phase;

a first regenerating mode operation is performed only when the index temperature for regeneration control is not less than a first specified judgment value, when the clogged-state of the filter is in the second phase; and a second regenerating mode operation involving a first control for heating up the exhaust gas without post-injection for heating up the temperature of the catalyst is performed, when the index temperature for regeneration control is not more than a second specified judgment value, while a second regenerating mode operation involving a second control for heating up the exhaust gas including post-injection is performed, supposing that the temperature of the catalyst is high, when the index temperature for regeneration control is not less than the second specified judgment value, in case where the clogged-state of the filter is in the third phase.

In other words, in this composition, the threshold for the clogged-filter-state is divided into two levels, high and low, and the higher threshold is set to a level requiring a coercive regeneration as the clogging advances, while the lower threshold is set to a value lower than this level with a margin for clogging.

There, while it is between these high and low thresholds, namely the second phase of clogging, there is still room for PM collection and discharge pressure elevation, and it concerns a state unnecessary to coercively regenerate despite of generation of deteriorated fuel consumption and deteriorated drivability.

Consequently, in this second phase of clogging, it shifts to the regenerating mode operation involving relatively low deterioration of fuel consumption or drivability and regenerates the filter (DPF), only when the condition that the operation state is not less than a temperature appropriate for regeneration (active temperature of oxidation catalyst) is met and it is unnecessary to coercively perform control for heating up the exhaust gas involving deteriorated fuel consumption and deteriorated drivability due to the temperature rising of the oxidation catalyst. Moreover, when the condition is not met, the normal operation is sustained without entering the regenerating mode operation.

The setting of the regenerating mode operation in this relatively low clogged-state (second state) prevents the fuel consumption from being deteriorated, by reducing the regeneration load in the engine operation and, at the same time, reducing the frequency of coercive regeneration involving a substantial rise in a temperature.

Then, in case where the third clogged-state requiring a coercive filter regeneration is attained, it is so composed to check the index temperature for regeneration control and to perform the second regenerating mode operation involving the first control for heating up the exhaust, when it is lower than a second specified judgment value temperature, and to perform the second regenerating mode operation involving the second control for heating up the exhaust, when it is not less than the second judgment value temperature. Therefore, it becomes possible to perform a regenerating mode operation appropriate for respective temperature.

In this second regenerating mode operation involving the second control for heating up the exhaust gas, the filter is regenerated by the second regenerating mode operation involving the second control for heating up the exhaust gas with reduced deterioration in fuel consumption and drivability than the second regenerating mode operation involving the first control for heating up the exhaust gas, because it is unnecessary to substantially heat up the exhaust gas, as in the second regenerating mode operation involving a higher index temperature for regeneration control and the first control for heating up the exhaust gas. Consequently, the deterioration in fuel consumption and the deterioration in drivability, involved in the regenerating mode operation, are avoided.

BRIEF DESCRIPTION OF THE DRAWINGS

FIG. 7 is a schematic illustrative drawing showing an example of control in the second phase of clogging in the control of the second embodiment, in which (a) shows the engine operation area, and (b) is an example of time sequence of catalyst temperature;

FIG. 9 is a schematic illustrative drawing showing an example of control in the fourth phase of clogging in the control of the second embodiment, in which (a) shows the engine operation area, and (b) is an example of time sequence of catalyst temperature;

DETAILED DESCRIPTION OF THE PREFERRED EMBODIMENTS

Now, the regeneration control method for a continuously regenerating diesel particulate filter device (continuously regenerating type DPF device, hereinafter) of an embodiment according to the present invention shall be described referring to drawings.

[Composition of Device]

Figure 1:
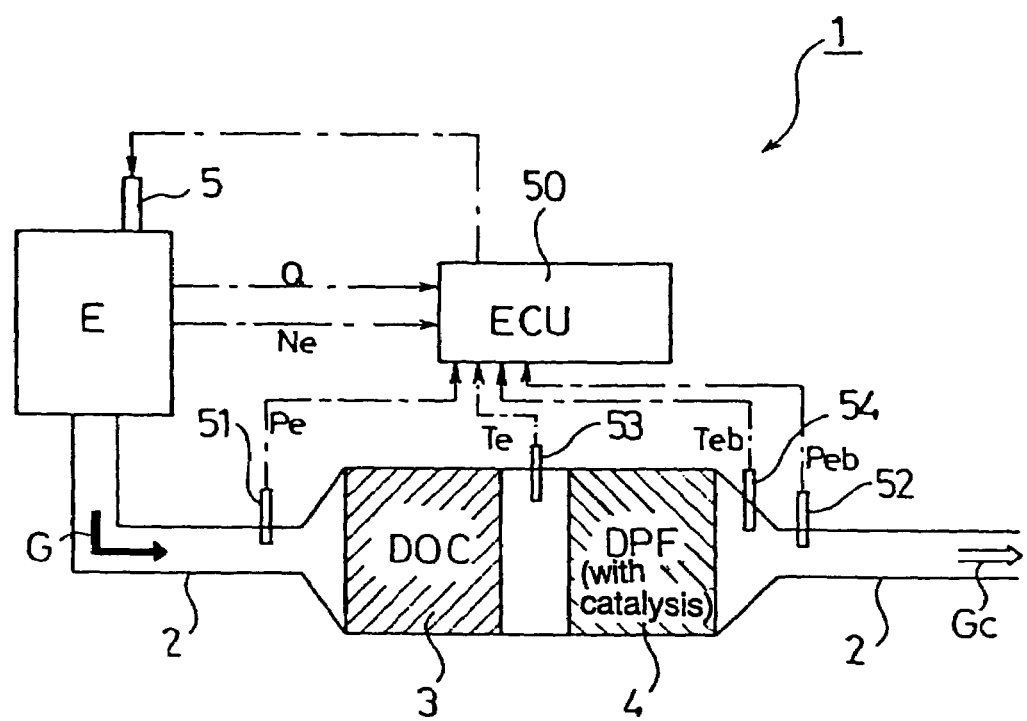
FIG. 1 is a composition diagram of a continuously regenerating diesel particulate filter device of an embodiment according to the present invention.

FIG. 1 shows the composition of a continuously regenerating type DPF device 1 for executing the regeneration control method according to the present invention. This continuously regenerating type DPF device 1 is a device installed in an exhaust passage 2 of an engine E, wherein an oxidation catalyst 3 and a filter with catalysis 4 are disposed from the upstream side.

There, a first exhaust pressure sensor 51 is installed on the exhaust inlet side of the oxidation catalyst 3, and, a first temperature sensor 53 is between the oxidation catalyst 3 and the filter with catalysis 4, a second exhaust pressure sensor 52 and a second temperature sensor 54 are on the exhaust outlet side of the filter with catalysis 4, for regeneration control of the filter with catalysis 4.

The output values of these sensors are input to an engine control unit (ECU: Engine Control Unit) 50 performing a general control of the engine operation and, at the same time, executing also the regeneration control of the filter with catalysis 4, and an engine fuel injection unit 5 is controlled by a control signal output from this control unit 50.

Besides, the oxidation catalyst 3 is formed by carrying platinum (Pt) or other oxidation catalyst on a support of honeycomb structure and so on of porous ceramic, while the filter with catalysis 4 is formed of a monolith honeycomb form wall flow type filter by alternately sealing the inlet and the outlet of channels of a porous ceramic honeycomb, a non-woven fabric like filter by laminating aluminum or other inorganic fiber at random, and so on. Platinum, cerium oxide or other catalyst is supported by this filter portion.

There, particulate matter (PM, hereinafter) in the exhaust gas G is trapped by a porous ceramic wall, in case of adopting a monolith honeycomb form wall flow type filter as filter of the filter with catalysis 4, while PM is trapped by inorganic fibers of the filter, in case of adopting the fiber form filter type.

[Regeneration Control Method of the First Embodiment]

Next, the regeneration control method of the first embodiment in the continuously regenerating type DPF device 1 of the foregoing composition shall be described.

This regeneration control method is performed following flows as illustrated in FIG. 2 to FIG. 5.

For the convenience of description, these illustrated flows are shown as a regeneration control flow to be called and executed reiteratively in parallel with the control flow of the engine E. In short, this flow is composed to be called and executed reiteratively every fixed period of time, in parallel during the operation control of the engine E, and not to be called any more, when the control of the engine E terminates, so as to substantially terminate the regeneration control of the filter with catalysis 4, too.

[Outline of Regeneration Control Method]

Figure 2:
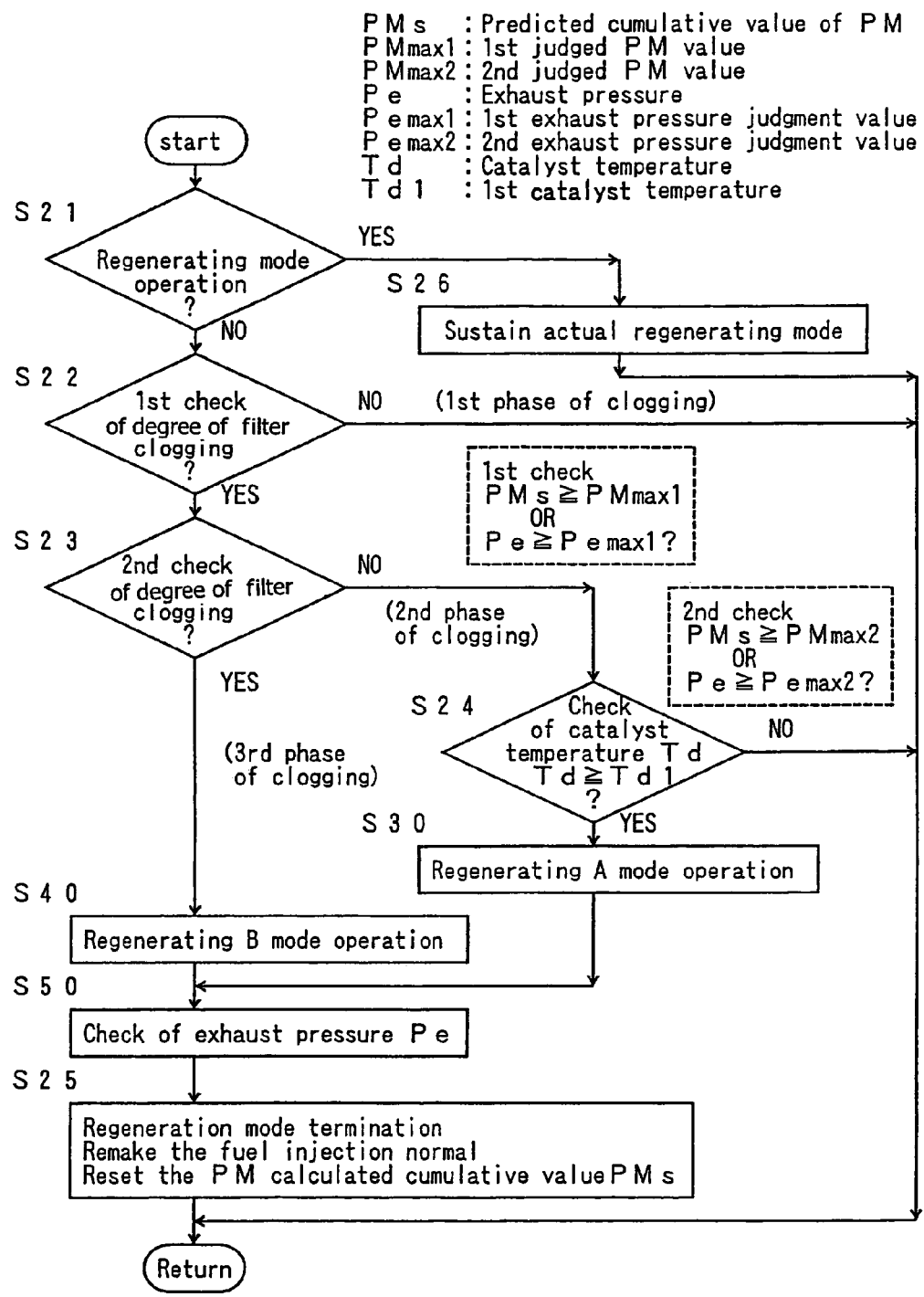
FIG. 2 is a flow chart showing a regeneration control method for the continuously regenerating diesel particulate filter device of a first embodiment according to the present invention.

In the regeneration control flow of the first embodiment of the present invention, as shown in the regeneration control flow of FIG. 2, the clogged-state is divided into three phase of clogging, to check the start of regenerating mode operation, by two clogging-judgments of degree of clogging of the filter.

There, in case where this degree of clogging of the filter is in a second phase of clogging exceeding a lower first clogging-judgment but not exceeding a second clogging-judgment and, furthermore, the catalyst temperature (index temperature for regeneration control) Td is in a temperature range exceeding a specified catalyst judgment temperature Td1, it is regenerated by the regenerating A mode operation (first regenerating mode operation) that would hardly provoke deterioration in fuel consumption nor deterioration in drivability.

On the other hand, in case where the degree of clogging of the filter exceeds a higher second clogging-judgment and attains a third phase of clogging, it is regenerated by the regenerating B mode operation (second regenerating mode operation) involving a substantial control for heating up the exhaust gas, namely, control for heating up the exhaust gas that would raise the exhaust gas temperature coercively.

It should be noted that, in the description of this first embodiment, though the catalyst temperature Td is selected and described as representative of index temperature for regeneration control and control for heating up the exhaust gas, it is not limited to this catalyst temperature Td, but it may be exhaust gas temperature and so on.

[Judgment of Start of Regenerating Mode Operation]

First, when this regeneration control mode starts, in a step S21, it is judged if it is in the regenerating mode operation or not, and if it is in the regenerating mode operation, the current regenerating mode operation is sustained.

In case where it is judged not to be the regenerating mode operation, in the judgment of the step S21, it is judged if it is the time to start of the regenerating mode operation from a step S22 to a step S24.

For these judgments, a first check of degree of filter clogging is performed first in the step S22. This check judges if the predicted cumulative value PMs of PM is not less than a first specified PM judgment value PMmax1, or, if the exhaust pressure Pe is not less than a first specified exhaust pressure judgment value Pemax1.

This predicted cumulative value PMs of PM is an estimated value of the quantity of deposition of PM calculated by calculating the quantity of PM discharged and the quantity of PM purified in an operation state from previously input map data and so on, from torque Q and engine rpm Ne showing the operation state of an engine E, and, DPF inlet temperature T1 and so on measured by the first temperature sensor 53, by calculating the quantity of PM deposited in the filter every that time, and performing the cumulative computation of the same.

In this step S22, when the predicted cumulative value PMs of PM is in a first phase of clogging not exceeding the first judged PM value PMmax1, it is judged that the degree of clogging is small and it is not the time to start the regenerating mode operation and it returns, and when the predicted cumulative value PMs of PM is not less than a second phase of clogging exceeding the first specified PM judgment value PMmax1, in the step 23, a second check of degree of filter clogging is performed.

This second check judges if the predicted cumulative value PMs of PM is not less than a second specified PM judgment value PMmax2, or, if the exhaust pressure Pe is not less than a second specified exhaust pressure judgment value Pemax2, supposing that second judged PM value PMmax2>first judged PM value PMmax1 and second exhaust pressure judgment value Pemax2>first exhaust pressure judgment value Pemax1. In short, the first clogging-judgment judges with a lower quantity of clogging, while the second clogging-judgment judges with a higher quantity of clogging.

In the second check of this step S23, in case where it is judged that the filter clogging does not attain the third phase of clogging, further, it is judged if the catalyst temperature (index temperature for regeneration control) Td exceeds a specified catalyst judgment temperature Td1 or not, by checking the catalyst temperature Td in the step 24, and if it exceeds, the flow goes to a step 30, to perform the regenerating A mode operation (first regenerating mode operation).

Then, in this step S23, if the degree of clogging is judged to be more than the second judged PM value PMmax2 and in a third phase of clogging, it goes to a step S40, to execute the regenerating B mode operation (second regenerating mode operation).

Then, upon termination of regenerating A mode operation or regenerating B mode operation, the exhaust pressure Pe is checked in a step S50, and thereafter, the fuel injection is reset to the original injection mode, and, regenerating mode termination operations such as resetting the predicted cumulative value of PM (PMs=0) and so on are performed, before returning.

[Regenerating A Mode Operation]

First, the regenerating A mode operation shall be described.

Figure 3:
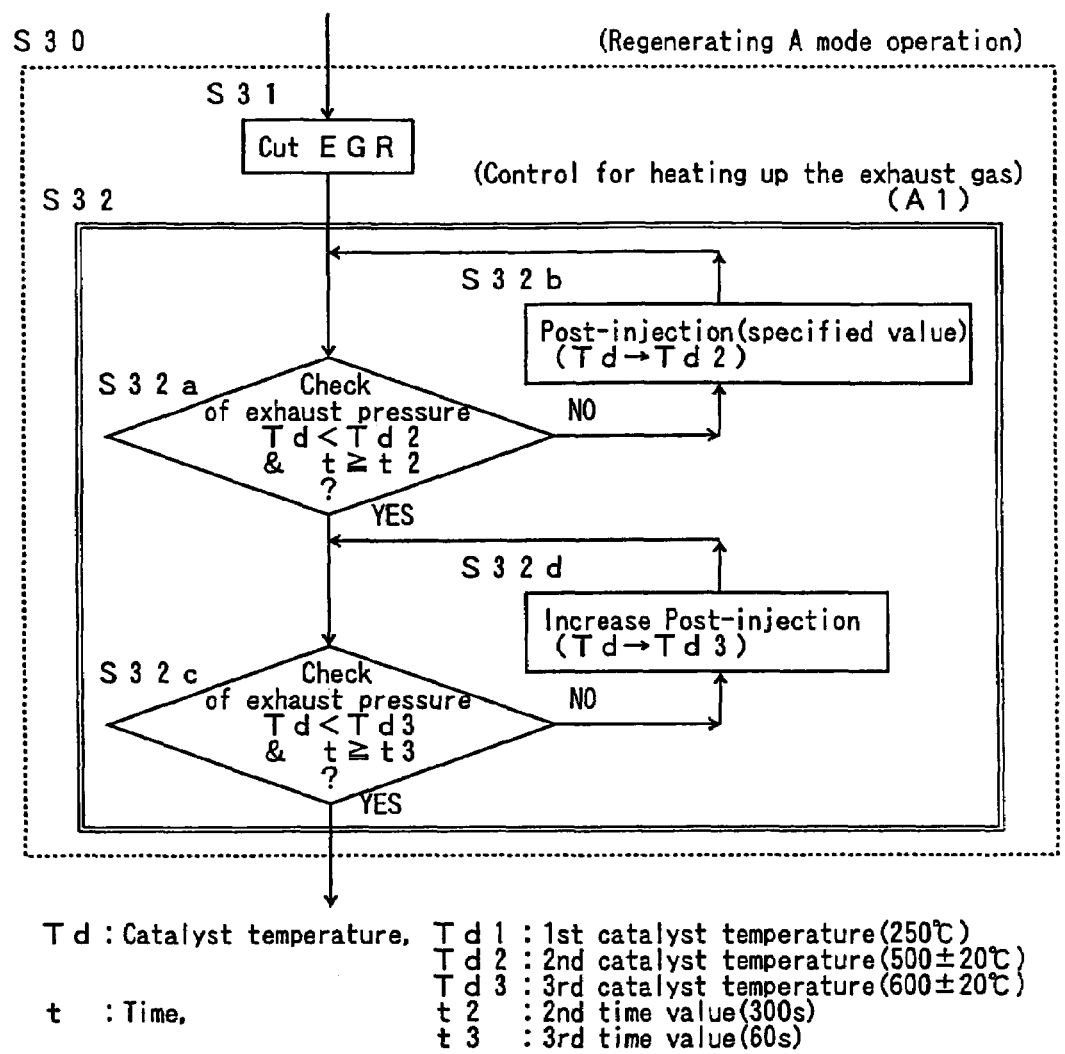
FIG. 3 is a diagram showing a detailed flow of a regenerating A mode operation of FIG. 2.

In this regenerating A mode operation, having passed the check of the step S24 and the catalyst temperature (index temperature for regeneration control) Td being already more than the specified catalyst judgment temperature Td1, EGR is cut in a step S31, as shown in FIG. 3, without preliminary heating by the retard (delay) of fuel injection, the control for heating up the exhaust A1 of a step S32 shall be performed referring to the catalyst temperature (index temperature for regeneration control) Td.

In this control for heating up the exhaust A1 of the step S32□ the post injection of the first stage of the heating up process is performed (post-injection) in a step S32a and a step S32b, after a post-injection of a specified quantity of fuel, and further, the exhaust gas is heated so that the catalyst temperature Td becomes a second specified catalyst temperature Td2. The temperature of the filter with catalysis 4 is raised by this post-injection to start burning PM.

Then, it waits that the catalyst temperature (index temperature for regeneration control) Td exceeds the second catalyst temperature Td2 and this exceeded time t elapses a second specified time value t2 or more before going the next step S32c and step S32d.

In the step S32c and step S32d of the second stage for the heating up process, the quantity of injection of the post-injection is increased to raise the exhaust gas temperature more, to a temperature appropriate for PM combustion, in short, it is so controlled that the catalyst temperature Td becomes a third specified catalyst temperature Td3 higher that the second catalyst temperature Td2, and it waits until the catalyst temperature Td exceeds the third specified catalyst temperature Td3, and this exceeded time t elapses a third specified time value t3 or more. There, PM is burned at an optimal temperature by controlling the quantity of injection of this post-injection.

Upon termination of this regenerating A mode operation, it goes to check the exhaust pressure Pe of a next step S50.

[Regenerating B Mode Operation]

Figure 4:
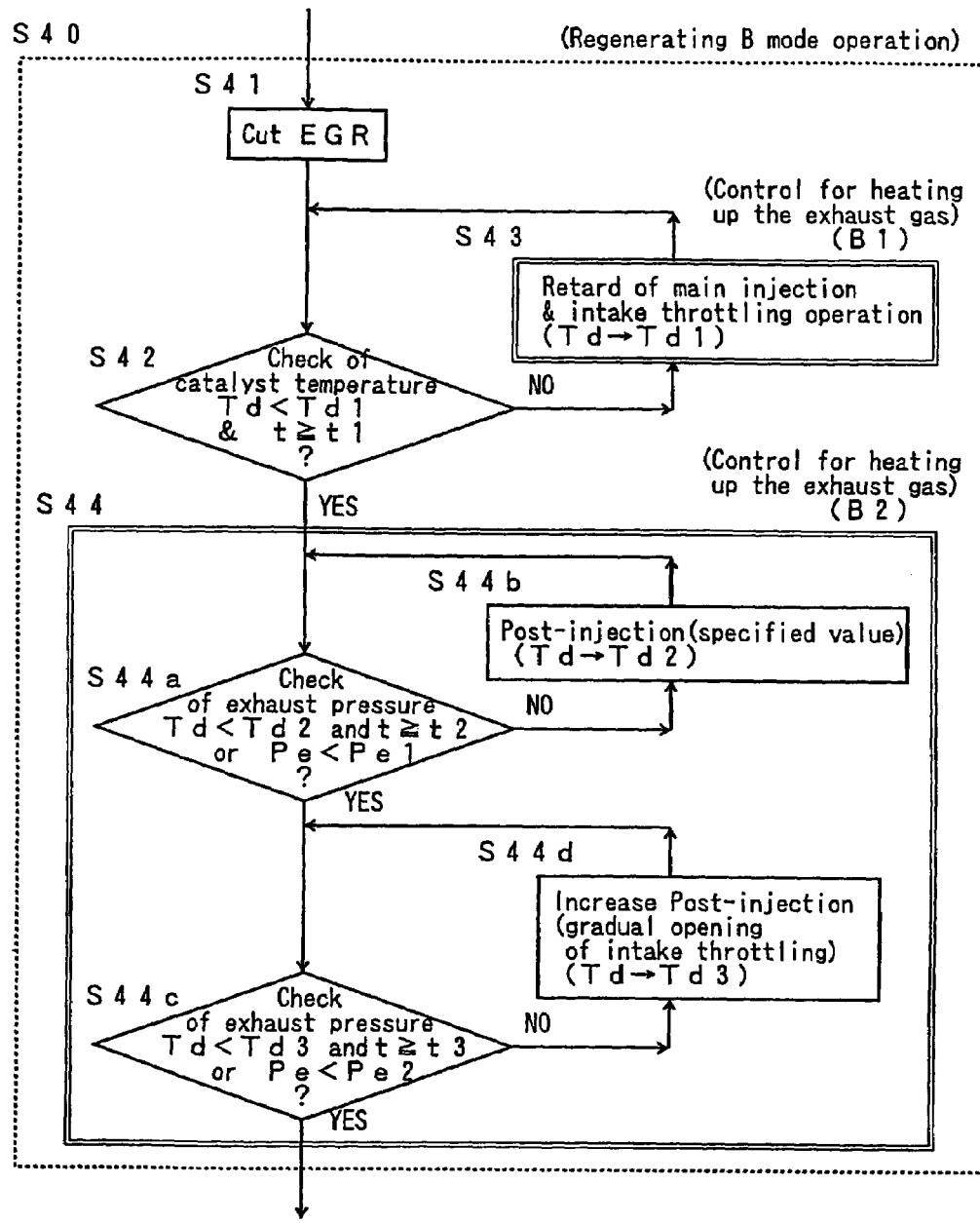
FIG. 4 is a diagram showing a detailed flow of a regenerating B mode operation of FIG. 2.

In this regenerating B mode operation, the EGR is cut in a step S41, as shown in FIG. 4 before checking the catalyst temperature (index temperature for regeneration control) Td in a step S42. If the catalyst temperature Td is lower than the first specified catalyst temperature Td1, a control for heating up the exhaust gas B1 is performed in a step S43, while if the catalyst temperature Td is higher than the first specified catalyst temperature Td1 and this higher time t exceeds the first time value t1, a control for heating up the exhaust gas B2 is performed in a step S44.

In the control for heating up the exhaust gas B1 of the step S43 in this first temperature range, the timing of the main injection (main) of fuel injection is delayed (retard), and moreover the admission throttling is performed, and the exhaust gas temperature is raised by these operations. The oxidation catalyst 3 is heated and activated the elevation of this exhaust gas temperature, and the generation of white smoke during the post-injection is avoided by a next control for heating up the exhaust gas B2.

The exhaust gas temperature is increased until the catalyst temperature Td exceeds the first specified catalyst temperature Td1 (for example 200° C. to 250° C.) by the retard operation of this main injection, and it waits until the catalyst temperature Td exceeds the first specified catalyst temperature Td1 and this exceeding time t elapses a first specified time value t1 or more, before going to a next step S44.

In the control for heating up the exhaust gas B2 of the step S44 of two-staged heat-up of the next second temperature range, a post-injection is performed in a step S44a and a step S44b (post-injection), specified quantity of fuel is post-injected to raise the exhaust gas temperature more so that the catalyst temperature Td becomes a second specified catalyst temperature Td2. The temperature of the oxidation catalyst 3 and filter with catalysis 4 is raised by this post-injection to start burning PM.

Then, it waits until the exhaust pressure Pe (or differential pressure ΔPe) becomes not more than a first specified exhaust pressure value Pe1 (or second differential pressure valueΔPe1), or, the catalyst temperature Td exceeds the second specified catalyst temperature Td2 and this exceeded time t elapses a specified second time value t2 or more before going to the next step S44C.

Then, the start of PM combustion is confirmed by the fact that the exhaust pressure Pe (or differential pressure ΔPe)

becomes not more than the second specified discharge pressure value Pe2 (or second differential pressure valueΔPe2).

This exhaust pressure Pe is an exhaust pressure measured by a first exhaust pressure sensor 51 on the exhaust inlet side of the oxidation catalyst 3, and this differential pressure ΔPe is a differenceΔPe=Pe−Peb of the exhaust pressure measured by the first exhaust pressure sensor 51 and an exhaust pressure measured by a second exhaust pressure sensor 52 on the exhaust outlet side of the filter with catalysis 4.

Then, in the next step S44c and step S44d, the quantity of injection of the post-injection is increased, and the intake throttling is performed gradually if the intake throttling is performed to raise the exhaust gas temperature to a temperature appropriate for PM combustion. In short, it is so controlled that the catalyst temperature Td becomes a third specified catalyst temperature Td3 higher than the second catalyst temperature Td2 and it waits that the exhaust pressure Pe (or differential pressure ΔPe) becomes not more than the third specified exhaust pressure value Pe3 (or third differential pressure valueΔPe3), or the catalyst temperature Td exceeds the third specified catalyst temperature Td3 and this exceeded time t elapses a third specified time value t3 or more. There, PM is burned at an optimal temperature, by controlling the quantity of injection of this post-injection.

Up termination of this regenerating B mode operation, it goes to check the exhaust pressure Pe of a next step S50.

It should be noted that, though not illustrated, in the step S43, when a fourth specified time value t4 has elapsed without the catalyst temperature Td exceeding the first specified catalyst temperature Td1, the regenerating mode operation is suspended to perform again the control for heating up the exhaust gas B1 after a fifth specified time value t5 has elapsed, and if this suspension is repeated N times, the control for heating up the exhaust gas B1 is terminated to light up an alarm light affirming an abnormal state.

Besides, if the ignition (IGN) is turned OFF, the number of times of suspension is memorized, and when the ignition is turned ON, it enters the regenerating mode operation.

[Checking of the Discharge Pressure and Terminating the Regenerating Mode Operation]

Figure 5:
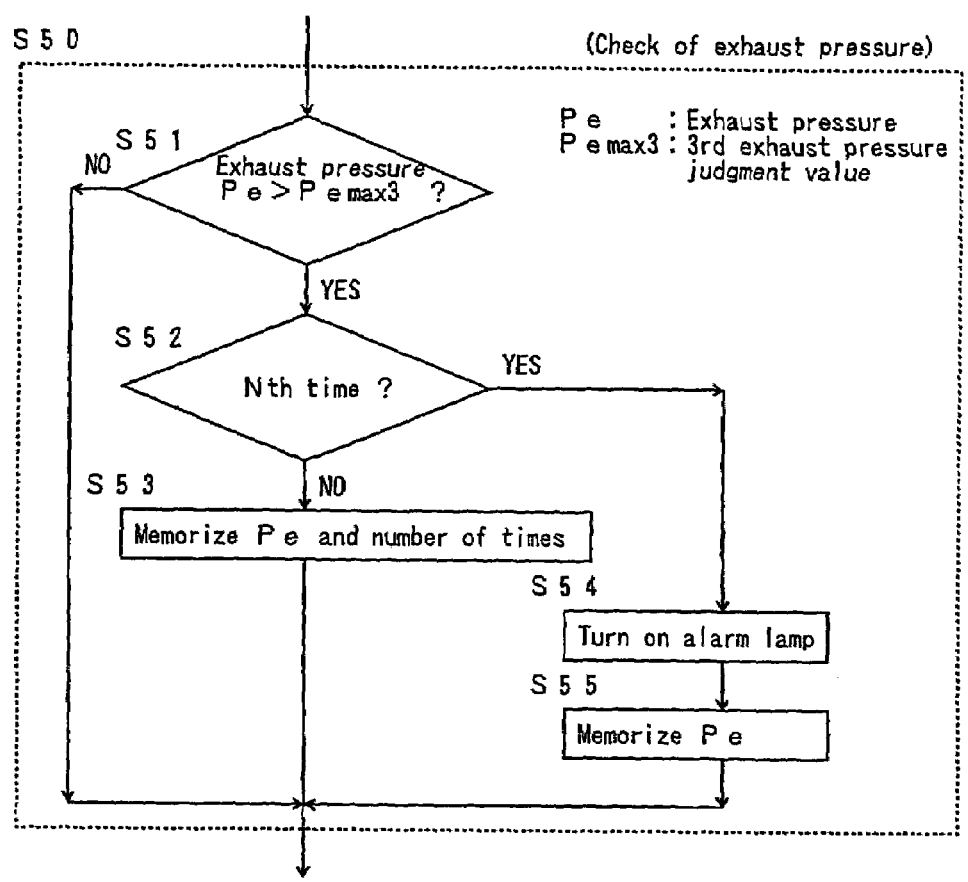
FIG. 5 is a diagram showing a detailed flow of the discharge pressure check of FIG. 2.

Then, in the step S50, the exhaust pressure Pe is checked in the step S51 according to a flow as shown in FIG. 5. If it becomes more than a third specified exhaust pressure value Pemax3 (<first exhaust pressure value Pemax1), it is judged if the number of times thereof is the Nth (specified number of times) time, and if it is not the Nth time, the value and the number of times of the exhaust pressure Pe is recorded in a step S53. Moreover, if it is the Nth time, an alarm light is turned on in a step S54, and the value of the exhaust pressure Pe is recorded in a step S55.

The lighting up of this alarm lamp informs the operator of the life end of the filter.

Then, in a step S25 shown in FIG. 2, the regenerating mode operation is terminated to remake the fuel injection normal, and at the same time, the PM calculated cumulative value PMs is reset to zero.

[Effects of the Control]

According to the aforementioned regenerating mode operation, in a continuously regenerating type DPF system, when the regenerating mode operation is performed by changing the engine operation state coercively, the threshold used for judgment of the filter PM calculated cumulative value PMs is divided into high and low values, first judged PM value PMmax1 and second judged PM value PMmax2.

And when the second phase of clogging exceeding the first judged PM value PMmax1, which is the lower threshold, and, when the catalyst temperature (index temperature for regeneration control) Td is not less than the first specified catalyst temperature Td1, the filter can be regenerated by raising the catalyst temperature Td by the regenerating A mode operation involving the control for heating up the exhaust gas A1 only by the post-injection causing relatively small deterioration in fuel consumption or deterioration in drivability.

Besides, even in case of third phase of clogging exceeding the second judged PM value PMmax2, which is the higher threshold, when the catalyst temperature (index temperature for regeneration control) Td is not less than the first specified catalyst temperature Td1, the filter can be regenerated by raising the exhaust gas temperature and catalyst temperature only by the regenerating B mode operation involving the control for heating up the exhaust gas B2 causing relatively small deterioration in fuel consumption or deterioration in drivability.

Consequently, the frequency of the regenerating B mode operation involving the control for heating up the exhaust gas B1 including the retard operation of the main injection or intake throttling, and causing deterioration in fuel consumption or deterioration in drivability can be reduced considerably, allowing to lower the regeneration load in the engine operation and prevent the fuel consumption or drivability from being deteriorated during the regeneration.

[Control Concerning Quantity]

Control concerning quantities concerning the exhaust pressure Pe in these flows are in a relation of first exhaust pressure judgment value Pe1>second exhaust pressure judgment value Pe2 (or, first differential pressure value ΔPe1<second differential pressure value ΔPe2), while the control concerning quantities concerning the catalyst temperature Td are in a relation of the first catalyst temperature Td1<second catalyst temperature Td2<third catalyst temperature Td3. It should be noted that the first time value t1 to the fifth time value t5 concerning the time are not specially mentioned about the magnitude relation, as time values concerning respective control are selected.

It should be noted that a regenerating mode operation wherein the injection quantity of the post-injection is increased more, so that the catalyst temperature Td becomes the fourth catalyst temperature Td4 (>third catalyst temperature Td3: for example 600° C.), or, it is controlled so that the catalyst temperature Td becomes the fourth catalyst temperature Td4, and to make a fourth specified time value t4 elapse in this state, in order to intend to completely remove PM trapped in the filter, in the regenerating A mode operation or regenerating B mode operation may be added.

[Regeneration Control Method of the Second Embodiment]

Now, the regeneration control method of the second embodiment shall be described.

Though, in the control flow of FIG. 2 to FIG. 5, the judgment of the clogged-filter-state is performed by two checks and the phase of clogging is divided into three phases, similarly, it can be made easily in four or more phases. This control flow in four phases is shown in FIG. 6.

Figure 6:
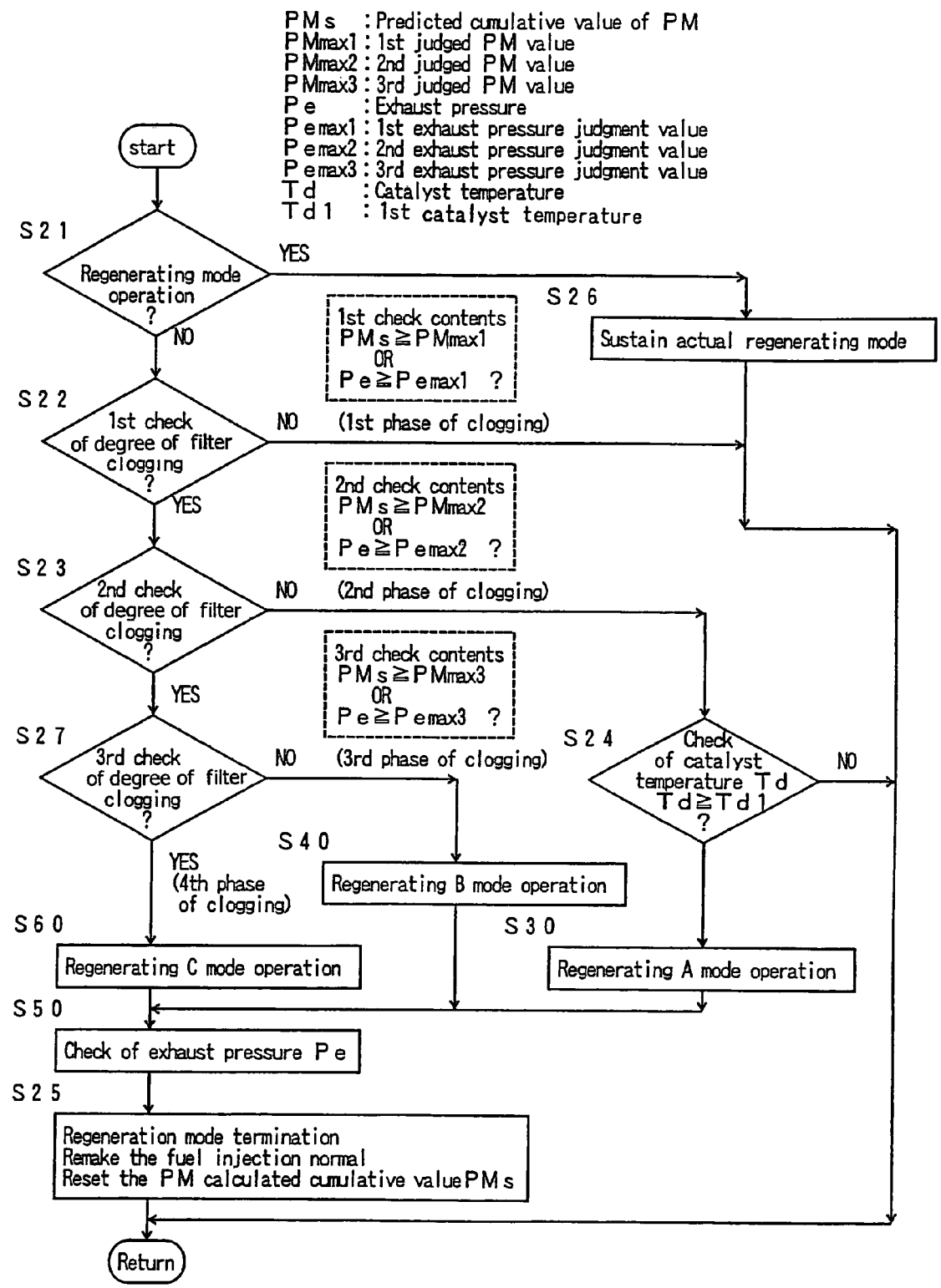
FIG. 6 is a flow chart showing a regeneration control method for the continuously regenerating diesel particulate filter device of a second embodiment according to the present invention.

In the control flow of this FIG. 6, the judgment of filter clogging state is judged by the three checks, in the first phase of clogging, the regeneration is determined unnecessarily, in the second phase of clogging, the regenerating A mode operation is performed only when the catalyst temperature Td is not less than the catalyst active temperature Td1, while in the third phase of clogging, the regenerating B mode operation involving the control for heating up the exhaust gas is performed only when the engine operation state (Q, Ne) is in a specified regenerating operation area Zb2. Moreover, in the fourth phase of clogging, the regenerating C mode operation is performed in the whole engine area Zc1, Zc2, Zc3.

More particularly, it is controlled as follows.

In the first phase of clogging of the phase of clogging divided into four phases, the regenerating mode operation shall not be performed, determining that the deposit quantity of particulate matter (PM) is almost null.

Then, in the second phase of clogging, as shown in FIG. 7(a), it is decided not to perform a preliminary heating operation in the whole area Za of the engine operation state. As shown in FIG. 7(b), when the catalyst temperature Td exceeds the catalyst active temperature Td1, a regenerating operation including only post-injection, shall be performed in Xa.

Also, in the third phase of clogging, as shown in FIG. 8(a), the preliminary heating operation is not performed in an area Zb1 of the engine operation state where the torque is middle to high and the exhaust gas temperature is relatively high, while, in an area Zb2 where the torque is low and the exhaust gas temperature is relatively low, for instance, a control for heating up the exhaust gas such as intake throttling is performed. As shown in FIG. 8(b), the catalyst temperature Td during the low torque operation is raised, to increase cases Xb where the catalyst temperature Td exceeds the catalyst active temperature Td1, and the filter can be regenerated by a regenerating operation including only post-injection without requiring a preliminary heating operation, in order to regenerate the filter.

Then, in the fourth phase of clogging which is the last phase, as shown in FIG. 9(a), the preliminary heating operation is not performed in an area Zc1 of the engine operation state where the torque is high and the exhaust gas temperature is relatively high, while in areas Zc2, Zc3 where the torque is middle to low and the exhaust gas temperature is relatively low, for instance, a control for heating up the exhaust gas such as intake throttling, intake throttling+retard and so on, is performed. And as shown in FIG. 9(b), the catalyst temperature during the operation is raised, to obtain a case Xc where the catalyst temperature Td exceeds the catalyst active temperature Td1, across the whole engine operation area, so that the filter can be regenerated over the whole engine operation area including idling.

Figure 8:
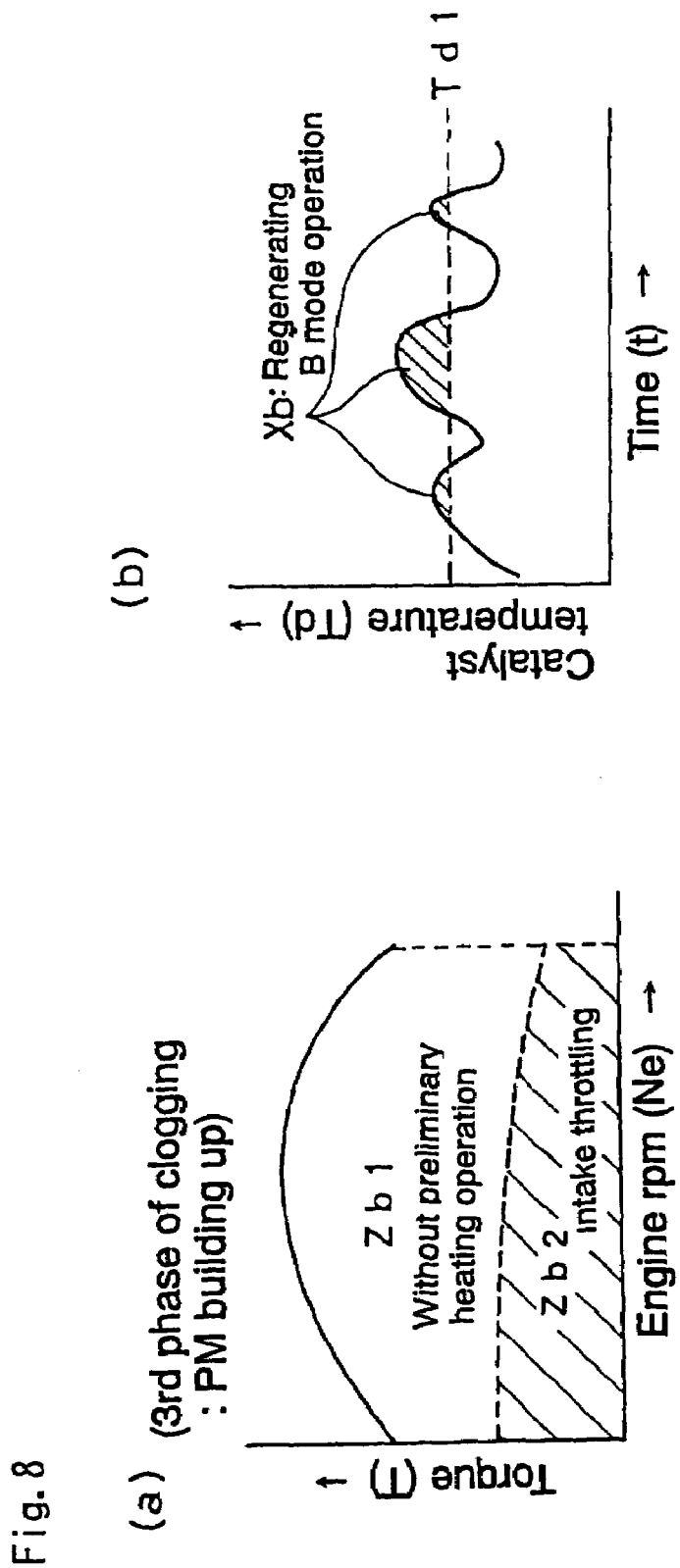
FIG. 8 is a schematic illustrative drawing showing an example of control in the third phase of clogging in the control of the second embodiment, in which (a) shows the engine operation area, and (b) is an example of time sequence of catalyst temperature.
Figure 10:
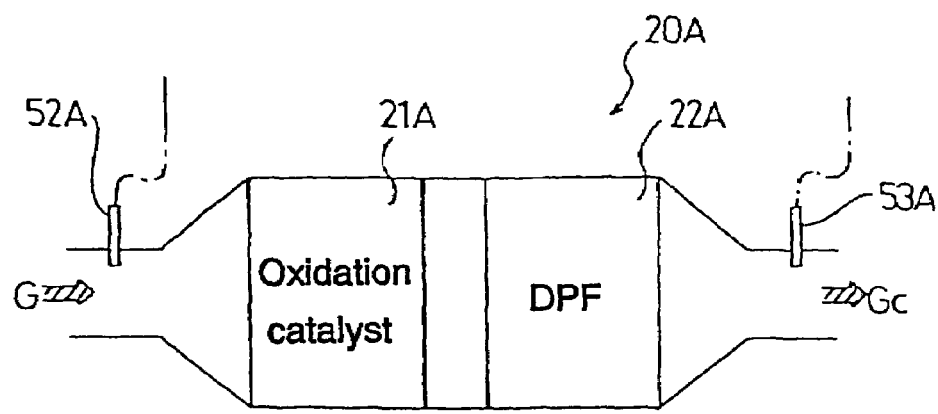
FIG. 10 shows an example of composition of a continuously regenerating type DPF device combining oxidation catalyst and filter.
Figure 11:
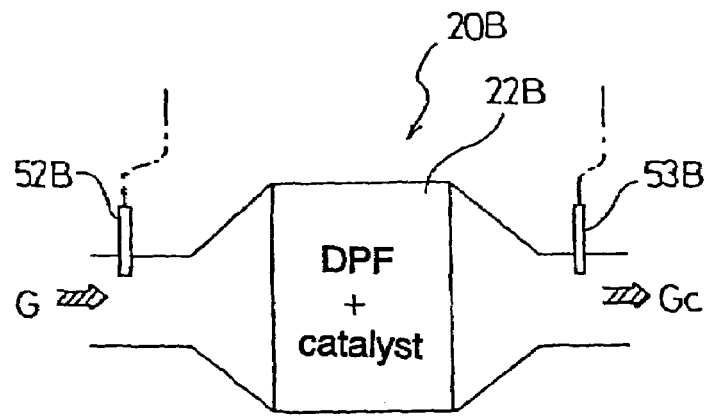
FIG. 11 shows an example of composition of a continuously regenerating type DPF device of a filter carrying a catalyst.

It should be noted that the division of operation areas in FIG. 7 to FIG. 9 is schematic and it may vary depending on the kind of engine, system of exhaust gas, atmospheric temperature, and so on. Also, though the means of control for heating up the exhaust gas for performing the preliminary heating operation was described taking intake throttling and intake throttling+retard as an example, it is not limited to them, but, in addition to the intake throttling, it can be composed of means, such as retard of the main injection timing of the fuel injection, post-injection (pot-injection), exhaust throttling, EGR, increase of load by driving an auxiliary, heating of exhaust gas by a heating means and so on, or combinations of several of these means.

Besides, in the aforementioned composition, though it is composed to perform a regenerating mode operation set in correspondence to the specified phase of clogging, only when the index temperature for regeneration control is not less than a specified judgment temperature, this index temperature for regeneration control and the engine operation state have a close relation, and the engine operation state can be used in place of index temperature for regeneration control, therefore, it is possible to compose to perform the regenerating mode operation set in correspondence to the specified phase of clogging, only when the engine operation state is in a specified engine operation area.

There, this engine operation area can be set by combining load and engine rpm, and so on, and integrated into the control by map data, and so on. In addition, it can be corrected by the atmospheric temperature and so on in order to increase the precision more.

It should be noted that, as for continuously regenerating diesel particulate filter device, though it has been described with a continuously regenerating diesel particulate filter device having a catalyst carried by the filter and at the same time provided with an oxidation catalyst on the upstream side of the filter, other than this, one can also have as object a continuously regenerating diesel particulate filter device having a catalyst carried by the filter, or a continuously regenerating diesel particulate filter device provided with an oxidation catalyst on the upstream side of the filter.

INDUSTRIAL APPLICABILITY

The present invention has an object to provide a regeneration control method for continuously regenerating diesel particulate filter device allowing to regenerate the filter by removing PM efficiently, all the way limiting the deterioration in fuel consumption and at the same time preventing the drivability from deteriorating, by selecting an appropriate control for heating up the exhaust gas among control for heating up the exhaust gas prepared in a plurality of kinds, and shifting to a regenerating mode operation involving this control for heating up the exhaust gas, in a period appropriate for the regeneration treatment, even if the phase of clogging is on the middle order, through the observation of the state where PM is collected and engine exhaust gas temperature or catalyst temperature simultaneously, in a continuously regenerating diesel particulate filter device.

Consequently, the present invention can be used for a continuously regenerating diesel particulate filter device having a catalyst carried by the filter, a continuously regenerating diesel particulate filter device provided with an oxidation catalyst on the upstream side of the filter, and a continuously regenerating diesel particulate filter device having a catalyst carried by the filter and at the same time provided with an oxidation catalyst on the upstream side of the filter and thereby, can purify effectively the exhaust gas from a vehicle and so on having these continuously regenerating diesel particulate filter devices on board, and prevent the air pollution.

What is claimed is:

1. A regeneration control method for regenerating a filter in a continuously regenerating-type diesel particulate filter device, for capturing particulate matters in exhaust gas from an engine and oxidizing and removing the captured particulate matters, comprising:

determining a state of clogging of the filter at four classified states of clogging of the filter;

performing no regeneration-mode operation when the state of clogging of the filter is at a first state of clogging;

when the state of clogging of the filter is at a second state of clogging, performing a regeneration control comprising a post-injection alone when a catalyst temperature exceeds a catalyst activated temperature;

when the state of clogging of the filter is at a third state of clogging, performing no preliminary heating operation when the exhaust-gas temperature is in a first temperature region in which torque is middle to high and the exhaust-gas temperature is relatively high, while performing an exhaust-temperature heating-up operation through an intake-throttling when the exhaust-gas temperature is in a second temperature region in which the torque is low and the exhaust-gas temperature is relatively low; and when the state of clogging of the filter is at a fourth state of clogging, performing no preliminary heating operation when the exhaust-gas temperature is in a first temperature region in which the torque is high and the exhaust-gas temperature is relatively high;

performing an exhaust-temperature heating-up operation accompanying an intake throttling when the exhaust-gas temperature is in a second temperature region in which the torque is medium and in which the exhaust gas temperature is relatively low; and performing an exhaust-temperature heating-up control accompanying an intake-throttling and an injection retarding when the exhaust-gas temperature is in a third temperature region in which the torque is low and the exhaust-gas temperature is low.

\* \* \* \* \*